(12) United States Patent
Achir et al.

(10) Patent No.: US 8,385,324 B2
(45) Date of Patent: Feb. 26, 2013

(54) METHOD AND DEVICE FOR MANAGING ALLOCATION OF DATA TRANSMISSION PATHS IN A MESHED COMMUNICATIONS NETWORK, CORRESPONDING COMPUTER PROGRAM PRODUCT AND STORAGE MEANS

(75) Inventors: Mounir Achir, Rennes (FR); Pascal Lagrange, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 991 days.

(21) Appl. No.: 12/406,747

(22) Filed: Mar. 18, 2009

(65) Prior Publication Data

US 2009/0257386 A1  Oct. 15, 2009

(30) Foreign Application Priority Data

Mar. 20, 2008 (FR) ..................... 08 51787

(51) Int. Cl.
*G06F 15/173* (2006.01)
*H04L 12/28* (2006.01)
*H04B 7/00* (2006.01)
*H04W 4/00* (2009.01)

(52) U.S. Cl. ........ 370/351; 370/310; 370/328; 370/329; 709/238; 709/241

(58) Field of Classification Search ............ 370/329, 370/351, 310, 328; 709/238, 241
See application file for complete search history.

(56) References Cited

U.S. PATENT DOCUMENTS

2002/0041640 A1  4/2002  Le Bars et al.
2005/0215214 A1*  9/2005  Moorti et al. .............. 455/193.1

OTHER PUBLICATIONS

Wu, K. and Harms, J. 2001. Performance study of a multipath routing method for wireless mobile ad hoc networks. Modeling, Analysis, and Simulation of Computer Systems, International Symposium on, 0:0099+.*

(Continued)

*Primary Examiner* — Ayaz Sheikh
*Assistant Examiner* — Tarell Hampton
(74) *Attorney, Agent, or Firm* — Fitzpatrick, Cella, Harper & Scinto

(57) ABSTRACT

A method for managing allocation of paths for transmission, in packets of symbols, of at least a first data content, each content being transmitted from a source node up to a destination node in a meshed communications network comprising a plurality of nodes, each destination node receiving a plurality of copies of a same packet of symbols of the content transmitted to said destination node by a source node, each copy being received by the destination node via a distinct transmission path directly from the source node or via at least one relay node of the meshed communications network, the packets being encoded with an error correction code enabling decoding by erasure of packets symbols. Such a method comprises the following steps: selecting a set of transmission paths from the source node up to the destination node for the transmission of copies of at least one packet of the first content, for which an estimated first number of erasures of symbols of the at least one packet is smaller than a determined threshold, the first number of erasures being estimated from a piece of information on quality of transmission that is determined and associated with each of the selected transmission paths, the threshold being determined as a function of an erasure correction capability of the error correction code; allocating the selected transmission paths to the transmission of the first content from said source node up to said destination node.

20 Claims, 9 Drawing Sheets

OTHER PUBLICATIONS

Hao-hua Chu and Klara Nahrstedt. 1997. Dynamic Multi-Path Communication for Video Traffic. In Proceedings of the 30th Hawaii International Conference on System Sciences: Software Technology and Architecture—vol. 1 (HICSS '97), vol. 1. IEEE Computer Society, Washington, DC, USA, 695-.*

Saewoong Bahk and Magda El Zarki. 1992. Dynamic multi-path routing and how it compares with other dynamic routing algorithms for high speed wide area network. SIGCOMM Comput. Commun. Rev. 22, 4 (Oct. 1992), 53-64. DOI=10.1145/144191.144205 http://doi.acm.org/10.1145/144191.144205.*

Sharma, V., Kalyanaraman, S., Kar, K., Ramakrishnan, K.K, and Subramanian, V. 2008. MPLOT: A Transport Protocol Exploiting Multipath Diversity using Erasure Codes. IEEE INFOCOM 2008.*

* cited by examiner

METHOD AND DEVICE FOR MANAGING ALLOCATION OF DATA TRANSMISSION PATHS IN A MESHED COMMUNICATIONS NETWORK, CORRESPONDING COMPUTER PROGRAM PRODUCT AND STORAGE MEANS

1. FIELD OF THE INVENTION

The field of the invention is that of systems of data transmission in wireless meshed synchronous communications networks.

More specifically, the invention relates to a technique of bandwidth allocation based on error correction in synchronous communications networks that may be subjected to fading and masking caused by fixed or moving obstacles.

The invention can be applied more particularly in the context of the broadcasting of data packets, i.e. cases where a node of the network, called a source node or sender node, broadcasts data packets intended for another node, called a destination node or final receiver node, through the communications network.

The invention can be applied especially to networks where the data packets are relayed by a set of nodes of the network to the destination node. This mode of transmission enables the reception, by the destination node, of a set of copies of the same data packet that will be exploited in order to improve the quality of service of the application. Each copy of the set of copies will take a particular transmission path determined by the mechanism of the invention.

2. TECHNOLOGICAL BACKGROUND

Communications in a wireless communications network very frequently undergo interfering and masking which may appreciably lower the quality of the data received.

Traditionally, several methods are used to cope with these sources of imperfections. These methods are generally classified as solutions using spatial diversity and solutions using temporal diversity.

Spatial diversity, characterized by a repetition code, resolves the effects of masking in a wireless communication system by limiting data packet losses caused by physical obstacles which interrupt communications.

Temporal diversity for its part improves the robustness of the data by correcting a portion of the errors of the data packet related to poor conditions of transmission in the network.

These two types of approaches are complementary and can be implemented in one and the same communications network.

In a meshed wireless communications network, the application of the method known as the spatial diversity method makes the network robust by increasing the possibility that the destination nodes will receive an accurate copy. Indeed, the source node sends an original data packet which, depending on the repetition code chosen, is relayed or not relayed by another node of the network, commonly called a relay node. The criterion of selection of the relay node responsible for relaying the data packet is fundamental and determines the performance of the network.

However, the conditions of reception in a communications network may differ from one node to another. The repetition code used to make communications more robust against interference and masking, must take account of the conditions of the transmission channel proper to each pair formed by a source node and a receiver node within the communications network.

Indeed, through the use of an adaptive repetition code, each of the destinations can receive a large number of copies if the conditions of transmission to this destination greatly corrupt the data packets or else it can receive a small number of copies if the contrary is the case. The data copies received by the destination node are thus combined to achieve the smallest possible bit error rate (BER).

3. GOALS OF THE INVENTION

It is a goal of the invention in one embodiment to provide a technique of allocation of data transmission paths that makes the use of the adaptive bandwidth.

It is another goal of at least one embodiment of the invention to provide a technique of this kind to determine the minimum number of transmission paths to be allocated to a destination node of the network enabling it to receive an adequate number of copies in order to successfully decode its own data. The ratio between consumed network bandwidth and error correction level for a given destination node of the network is thus optimized.

It is a complementary goal of at least one embodiment of the invention to allocate transmission paths, not needed by certain destination nodes, to other destination nodes wishing to obtain a number of additional copies in order to decode their data efficiently. More particularly, it is a goal of the invention to release resources which, in principle, are not needed by certain destination nodes and to make them available to others.

It is another goal of at least one embodiment of the invention to provide a technique of this kind that is simple to implement and costs little.

4. SUMMARY OF THE INVENTION

One particular embodiment of the invention proposes a method for allocating paths for transmission, in packets of symbols, of a first data content from a source node up to a destination node in a meshed communications network comprising a plurality of nodes, a destination node for a content receiving a plurality of copies of a same packet of symbols of said content sent by a source node, each copy being received via a distinct transmission path from said source node directly or via at least one relay node of the meshed communications network, said packets being encoded with an error correction code enabling decoding by erasure of packets symbols.

Such a method comprises the following steps:
  selecting a set of transmission paths from said source node up to said destination node for the transmission of said first content, for which an estimated first number of erasures is smaller than a determined threshold, said first number of erasures being estimated from a piece of information on quality of transmission that is determined and associated with each of said selected transmission paths, said threshold being determined as a function of an erasure correction capability of said error correction code;
  allocating said selected transmission paths to the transmission of said first content from said source node up to said destination node.

The general principle of the invention therefore consists in selecting a set of transmission paths enabling the transmission, from a source node to a destination node, of an adequate number of copies of a same data packet so that the destination node can perform a successful decoding of these pieces of data.

Thus, the invention limits the bandwidth consumption needed for each node of the destination node of a data content so that the destination node can perform a successful decoding of the data addressed to it.

Advantageously, a number of erasures is estimated from the following formula:

$$N_{Erasures} = \frac{k}{N} \sum_{i=1}^{M} \prod_{j=1, j \neq i}^{M} (1 - (1 - BER_j)^N)$$

with:
$N_{Erasures}$: said estimated number of erasures;
$BER_j$: the bit error rate of the copy j for its transmission from the source node to destination node;
k: the size of a packet in bits;
N: the number of bits per symbol;
M: the number of paths selected Thus, the above-mentioned formula enables an estimation of the number of erasures that the destination node must correct, on the basis of information on quality of transmission associated with the transmission paths enabling the transmission of each of the copies of the data packet up to the destination node.

Advantageously, the allocation method also comprises preliminary step of determining a set of relay nodes, called last relay nodes, capable of communicating directly with the destination node, and step of determining possible transmission paths from said source node up to each of said relay nodes. The above-mentioned selecting step is thus performed on the basis of possible determined transmission paths.

Thus, all the transmission paths selected here below shall be decorrelated to the greatest extent possible. In other words, the selected transmission paths will have a minimum number of relay nodes in common.

According to an advantageous characteristic, said step of determining possible transmission paths is performed by selecting a single transmission path for each of the last relay nodes among possible transmission paths for said last relay node.

Thus, it is possible to define a sequence of access to the medium of the transmission network by the different nodes of the communications network that enables access to the medium by each of the nodes only once per transmission cycle and thus increases the useful bandwidth of the communications network (through the reduction of overhead).

In an advantageous embodiment of the invention, said single transmission path is selected as a function of a piece of information on quality of transmission associated with said possible transmission paths for said last relay node.

Thus, the transmission path associated with a last relay node will be selected so as to ensure the relaying of the copy of the data packet which in principle has the best transmission quality.

According to an advantageous characteristic, said piece of information on quality of transmission corresponds to a piece of information on the bit error rate associated with said transmission paths.

Advantageously, said piece of information on transmission quality further corresponds to a piece of information representing the relative position of the last relay nodes in relation to the destination node.

Thus, the method takes advantage of a relative position of the nodes, which is determined or determinable, to select the transmission paths which in principle are adapted to the decoding of a content for a given destination node; this is the case, for example, of a wireless communications network for the broadcasting of audio signals in a home cinema type system where each speaker has a specified position in the system and which further comprises a communications node and is connected to an audio content broadcasting node through the wireless communications network.

According to an advantageous characteristic, the method further comprises a step for determining a set of non-selected transmission paths corresponding to transmission paths present in a reference allocation for the transmission of said first content from said source node up to said destination node and not selected during the selecting step.

Thus, the transmission paths made available can be allocated to other transmissions in the communications network.

Advantageously, the allocation method further comprises a step of allocating at least one of said transmissions paths to a requesting destination node for transmission of a second data content.

More specifically, the transmission paths made available can then be allocated to another destination node, called a requesting destination node, i.e. a node that wishes to receive additional copies relative to a reference allocation.

Thus, the destination node can carry out a more efficient error correction since this node will receive more copies, even in the event of a change in conditions of transmission.

Preferably, prior to said allocating step, said requesting destination node is a destination node having a set of assigned transmission paths for which an estimated second number of erasures is strictly greater than said predetermined threshold.

Thus, the destination node can in principle perform an error correction to decode data sent to it whereas the reference allocation would not allow it in principle to guarantee a decoding of this kind.

The invention therefore makes it possible to achieve adaptive redundancy for all nodes of the communications network.

Advantageously, the allocation method further comprises a step of determining a retransmission table, called a new retransmission table, representing a distribution and an occupation of bandwidth in the network, performed as a function of said step or steps of allocating transmission paths.

Thus, each relay node of the network can have a piece of information available representing the occupation of the bandwidth in the communications network as well as copies of data packets transmitted to each destination node.

Advantageously, the allocation method further comprises the following steps:
  determining a first number of nodes, which are destination nodes for given contents, having a set of assigned transmission paths for which an estimated number of erasures is smaller than said predetermined threshold, if said new retransmission table is used;
  comparing the first determined number of nodes with a second number of nodes, which are destination nodes for said given contents, having a set of assigned transmission paths for which an estimated number of erasures is smaller than said predetermined threshold, if a reference retransmission table is used.

Said new retransmission table is adopted if the result of said comparison verifies at least one condition.

This approach prevents the activation of the new retransmission matrix if this matrix gives mediocre performance as compared with the reference retransmission matrix.

Preferably, said condition belongs to the group wherein:
  the first number of nodes is greater than the second number of nodes;

the bandwidth occupied by the new retransmission table is smaller than the bandwidth occupied by the reference retransmission table.

In another embodiment, the invention relates to a computer program product downloadable from a communications network and/or recorded on a computer-readable carrier and/or executable by a processor, said computer program product comprising program code instructions for the implementation of the allocating method as described here above.

In another embodiment, the invention relates to a computer-readable storage means, storing a set of instructions executable by said computer to implement the decoding method as described here above In another particular embodiment of the invention, a device is proposed for allocating paths for transmission, in packets of symbols, of a first data content from a source node up to a destination node in a meshed communications network comprising a plurality of nodes, a destination node for a content receiving a plurality of copies of a same packet of symbols of said content sent by a source node, each copy being received via a distinct transmission path from said source node directly or via at least one relay node of the meshed communications network, said packets being encoded with an error correction code enabling decoding by erasure of packets symbols.

Such a device comprises:
first means for selecting a set of transmission paths from said source node up to said destination node for the transmission of said first content, for which an estimated first number of erasures is smaller than a determined threshold, said first number of erasures being estimated from a piece of information on quality of transmission that is determined and associated with each of said selected transmission paths, said threshold being determined as a function of an erasure correction capability of said error correction code;
first means for allocating said selected transmission paths to the transmission of said first content from said source node up to said destination node.

Advantageously, the device comprises means for estimating a number of erasures from the following formula:

$$N_{Erasures} = \frac{k}{N} \sum_{i=1}^{M} \prod_{j=1, j \neq i}^{M} (1 - (1 - BER_j)^N)$$

with:
$N_{Erasures}$: said estimated number of erasures;
$BER_j$: the bit error rate of the copy j for its transmission from the source node to destination node;
k: the size of a packet in bits;
N: the number of bits per symbol;
M: the number of paths selected Advantageously, the device comprises preliminary means for determining a set of relay nodes, called last relay nodes, capable of communicating directly with the destination node, and first means for determining possible transmission paths from said source node up to each of said relay nodes. Said first selection means are thus activated by said first determining means from determined possible transmission paths According to an advantageous characteristic, said first determining means are activated by second selecting means, said second selecting means selecting a single transmission path for each last relay node among possible transmission paths for said last relay node.

Preferably, said second selecting means are implemented as a function of a piece of information on transmission quality associated with said possible transmission paths for said last relay node.

Preferably, said piece of information on transmission quality corresponds to a piece of information on the bit error rate associated with said transmission paths.

Advantageously, said piece of information on transmission quality further corresponds to a piece of information representing the relative position of the last relay nodes relative to the destination node.

According to an advantageous characteristic, the device further comprises second means for determining a set of non-selected transmission paths corresponding to transmission paths present in a reference allocation for the transmission of said first content from said source node up to said destination node and not selected by said first selection means.

According to an advantageous embodiment, the device further comprises second means for allocating at least one of said transmissions paths to a requesting destination node for transmission of a second data content.

Advantageously, said requesting destination node is a destination node having a set of assigned transmission paths for which an estimated second number of erasures is strictly greater than said predetermined threshold.

Advantageously, the device further comprises third means for determining a retransmission table, called a new retransmission table, representing a distribution and an occupation of bandwidth in the network, implemented as a function of said second means for allocating transmission paths.

Advantageously, the device further comprises:
fourth means for determining a first number of nodes, which are destination nodes for given contents, having a set of assigned transmission paths for which an estimated number of erasures is below said predetermined threshold, if said new retransmission table is used;
means for comparing the first determined number of nodes with a second number of nodes, which are destination nodes for said given contents, having a set of assigned transmission paths for which an estimated number of erasures is below said predetermined threshold, if a reference retransmission table is used.

The device further comprises means for adopting said new retransmission table, said adopting means being activated if the result of said comparison verifies at least one condition.

Preferably, said condition belongs to the group wherein:
the first number of nodes is greater than the second number of nodes;
the bandwidth occupied by the new retransmission table is smaller than the bandwidth occupied by the reference retransmission table.

5. LIST OF FIGURES

Other features and advantages of embodiments of the invention shall appear from the following description, given by way of an indicative and non-exhaustive example (not all the embodiments of the invention are limited to the characteristics and advantages of the embodiments described here below), and from the appended drawings, of which:

6. DETAILED DESCRIPTION

In all the figures of the present document, the identical elements and steps are designated by the same numerical references.

Figure 1:
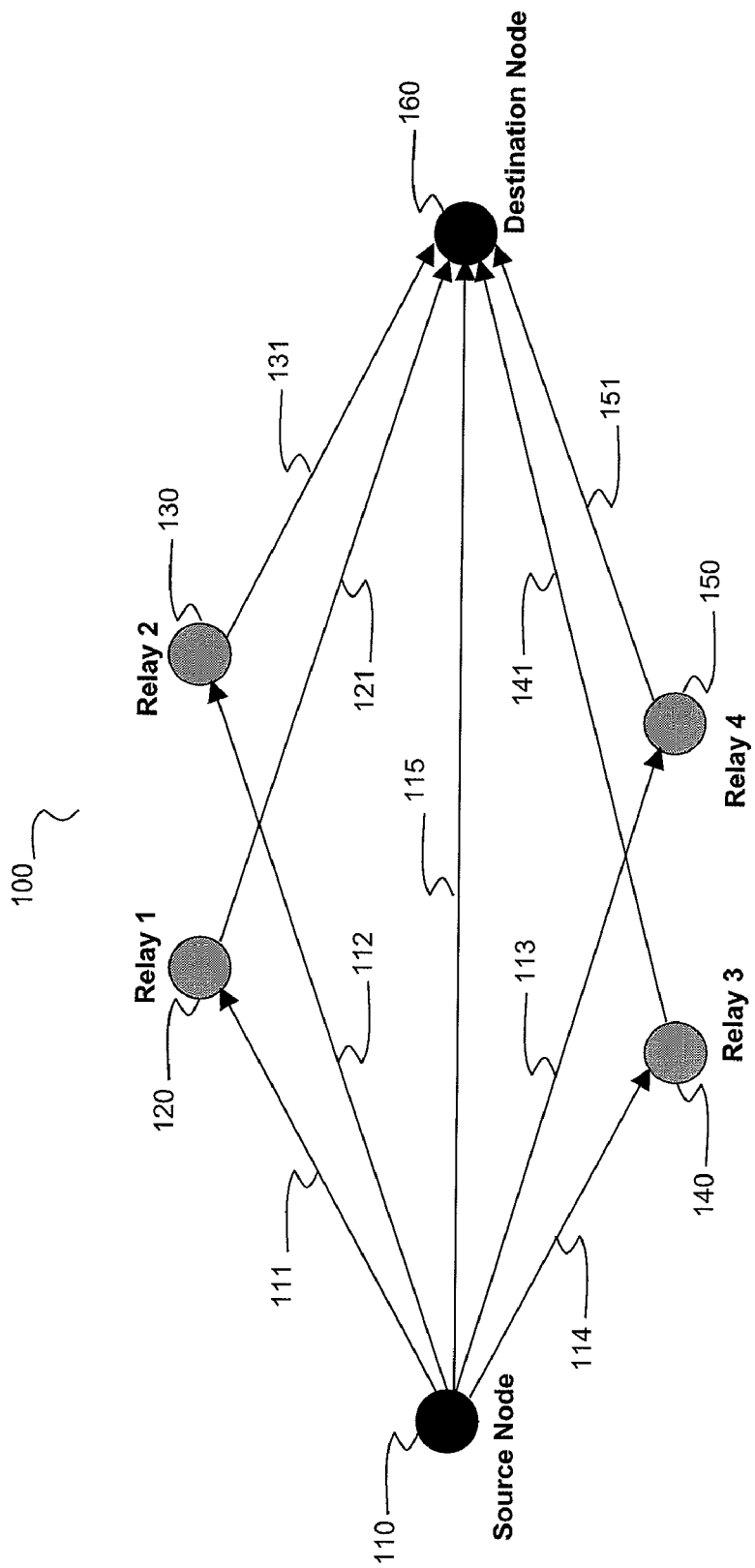
FIG. 1 shows an example of a communications network in which the allocation method according to a particular embodiment of the invention can be implemented.

FIG. 1 shows a communications network 100 in which the invention can be implemented. This is a meshed wireless communications system comprising several communications nodes referenced 110, 120, 130, 140, 150, 160. More specifically, each of the nodes of the communications network 100 is capable of sending and receiving data.

The following description considers the particular case of the broadcasting of a data content to the communications node 160, also called a final receiver node or destination node, in a communications network 100, by means of super-frames transmitted during an STDC (Synchronous Data Transmission Cycle). A super-frame consists of radio packets sent out by a set of nodes of the network during an SDTC in a predetermined sequence of access to the medium. This set of nodes includes the communications node 110, also called a source node or sender node, which is the source of the broadcasting of at least said data content. The other nodes, during their time of access to the medium, repeat the data sent by the source node so as to broadcast the data content to the final receiver node 160.

In this particular embodiment, the final receiver node 160 then receives several copies from multiple transmissions representing a same data packet, which are retransmitted by the nodes 120, 130, 140, 150, also called relay nodes, to the destination node 160, from an initial transmission of the data by the source node 110.

This transmission mode enables the reception, by the destination node 160, of a group of copies which will be exploited in order to improve the quality of service of the application. Indeed, the correction of errors in the data received enables retrieval of the original piece of data before a packet of data is sent.

The copies of data are received by the relay nodes 120, 130, 140, 150 and by the destination node 160 respectively through the links 111, 112, 113, 114 and 115. Certain relay operations are performed by the relay nodes 120, 130, 140, 150 respectively through the links 121, 131, 141 and 151 to the destination node 160.

Furthermore, the retransmission (or relaying) of the data packets by the relay nodes must be done in using a switching protocol. This protocol is based on a retransmission table used to relay the data packets to each destination node. The retransmission table thus represents a distribution and an occupation of bandwidth in the network.

The links 111, 112, 113, 114, 115, 121, 131, 141 and 151 thus represent the route taken by various copies received by the final receiver node 160 through several distinct transmission paths.

It is important to note that each of the copies received by the final destination node 160 takes a particular transmission path according to the method of allocation of the invention. Each copy is therefore received with a certain error rate due to interferences related to the transmission path taken and the transmission channel.

Since the copies of data take a plurality of different transmission parts, they are in principle not identical when they reach the destination node.

According to a preferred embodiment of the invention, a device for the allocation of the transmission paths is integrated into each of the nodes (source node 110, relay nodes 120 to 150 and destination node 160) of the communications network 100.

Figure 2:
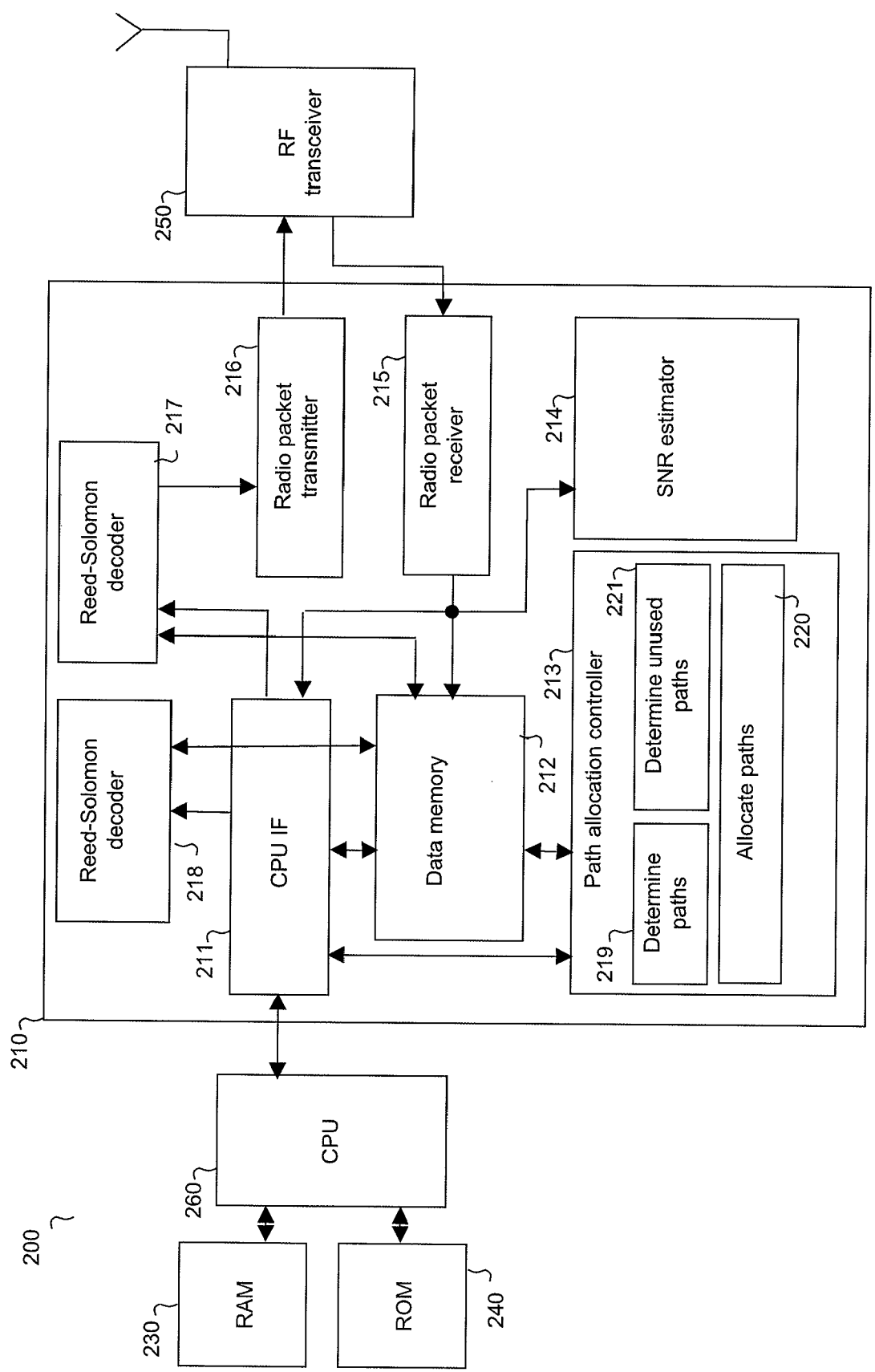
FIG. 2 is a functional block diagram of a device for the allocation of transmission paths according to a particular embodiment of the method of the invention.

Referring now to FIG. 2, a particular embodiment is presented of an allocation device of the communication network implementing the allocation method according to the invention.

The allocation device 200 comprises the following elements:
- a RAM (random-access memory) execution memory block 230;
- a ROM (read only memory) non-volatile memory block 240;
- a CPU (central processing unit) 260;
- a radio-frequency transceiver 250 to send and receive data through the transmission medium;
- a processing module 210 that communicates with the CPU 260 and the radio-frequency transceiver module 250.

Furthermore, according to the particular embodiment of the invention, the processing module 210 of the decoding device 200 comprises especially:
- an interface module CPU IF 211 which corresponds to the interface between the CPU and the baseband part. The interface module CPU IF 211 manages especially data exchanges between the different blocks of the processing module 210 (described in detail here below) and the CPU 260;
- a memory 212 for the storage of the data, especially for the storage of the different tables determined during the execution of the allocation methods;
- an encoder 217 and a decoder 218, for example of the Reed-Solomon type;
- an estimator 214 of the signal-to-noise ratio or SNR necessary for the mechanism for computing the bit error rate (BER) of the different links forming each transmission path. The signal-to-noise ratio or SNR is measured for each data packet received. The signal-to-noise ratio SNR can be measured at the radio level, for example with a measurement of RSSI (Received Signal Strength Indication) or else at the level of the modulation. A technique presented in the U.S. patent application 2002/0041640A1 proposes an estimation of the noise of the transmission channel, referenced B. This estimation is obtained by adding up the measurements of the deviation of the power of each symbol received relative to a theoretical value. This value corresponds to the power of the symbol having the smallest distance from the received symbol. The result is divided by the number of symbols considered. This corresponds to the application of the criterion of maximum likelihood which likens a received symbol to the neighbor closest to it in terms of distance. The formula (1) thus obtained is the following:

$$B = \frac{\sum_{i=1}^{k} \min_i [(S_i^* - S_i)^2]}{k} \quad (1)$$

with i: an integer;

k: the number of symbols per data packet;

min: the smallest Euclidean distance between a received symbol and a theoretical point of the constellation of the modulation;

$S_i^*$: the position of the received symbol; and $S_i$: the position of the theoretical symbol.

When the noise of the canal after reception of a data packet has been computed, the signal-to-noise ratio SNR can be estimated by dividing the mean power per symbol by the power of the noise computed according to the previous equation (1). The formula (2) giving the signal-to-noise ratio SNR of a data packet is written as follows:

$$SNR = \frac{\sum_{i=1}^{k} (S_i^*)^2}{B \cdot k} \quad (2)$$

It must be noted that, according to a particular embodiment of the invention, the signal-to-noise ratio SNR is measured permanently, i.e. as and when the data packets are received by the nodes.

a controller 213 for the allocation of transmission paths which executes the steps of the allocation method described here below with reference to FIG. 6. The controller 213 also brings together the module 219 for determining the transmission paths (executing the step 700 described here below with reference to FIG. 7), the module 220 for determining the unused transmission paths (executing the step 800 described here below with reference to FIG. 8) and the module 221 for the allocation of transmission paths (executing the step 900 described here below with reference to FIG. 9). This module, as a function of a piece of information on the transmission quality of the data packets, determines a set of copies, each of the copies being associated with a transmission path, sufficient to enable the decoder to perform a decoding which in principle, is accurate (i.e. the errors related to the transmission interference will have been corrected). This piece of information on transmission quality is based on the computation of the previous BER and, in the case of an erasure correction code, enables the estimation of the number of erasures corresponding to the copies coming from the transmission paths selected by the controller 213 according to the following formula (3):

$$N_{Erasures} = \frac{k}{N} \sum_{i=1}^{M} \prod_{j=1, j \neq i}^{M} (1 - (1 - BER_j)^N) \quad (3)$$

with:

$N_{Erasures}$: the number of erasures expressed in symbols;

$BER_j$: the bit error rate of data copy j for its transmission from the source node to the destination node (possibly through relay node);

k: the size of a data packet in bits;

N: the number of bits per symbol; and

M: the number of copies selected (i.e. the number of paths selected).

The equation (3) is used to estimate the number of erasures obtained from a certain number of copies received by a destination node. The equation (3) models a method which determines the exact number of erasures by making symbol/symbol comparisons of all the copies received by the destination node: if for the same symbol (or same location), the value of the symbol is different for each copy received, then this symbol is considered to be erroneous; conversely, the symbol is considered to be correct if at least two values of the same symbol are identical among the copies received.

The basic principle of the invention (3) consists of the computation of the symbol error rate SER from the bit error rate BER and the number of bits contained in a symbol. This symbol is represented in the equation (3) by the parameter N.

The following equation (4) gives the relationship between the symbol error rate SER and the bit error rate BER for a packet i:

$$SER_i = 1 - (1 - BER_i)^N \quad (4)$$

In the following examples, the symbol error rate SER will be taken to be the probability of a symbol being erroneous; the probability is denoted by $P_i$ such that:

$P_i = SER_i$.

According to a first example given by way of an illustration, we consider the case of a comparison of two data packets (or two copies).

In considering two copies of a same data packet transmitted by the source node 110 and received by the destination node 160, the probability P of two copies containing a different value for a same symbol and having the same position in each of the copies, taken randomly from among the set of symbols in each of the copies, is equal to:

$$P = P_i + P_j \quad (5)$$

In this case, it must be noted that one term in the above formula has been overlooked. Indeed, it has been assumed that the probability of two erroneous signals being equal is zero.

By multiplying the probability obtained by the total number of symbols that can be compared (i.e. the number of symbols per data packet), the number of different symbols between the two copies is obtained. This number is equal to the following formula (6):

$$N_{Erasures} = k/N \cdot (P_i + P_j) \quad (6)$$

This number corresponds to the estimated number of erasures obtained after symbol/symbol comparison of the two copies.

In a second example given by way of illustration, we consider the case of a comparison of three data packets (or three copies).

In the case of three copies, a formula similar to the formula (5) is obtained but of the third order. Making the same assumption, i.e. the probability P that two erroneous symbols are equal is zero, the probability P that three copies contain a different value for a same symbol, taken randomly in the set of symbols associated with each of the three copies i, j, l is equal to the following formula:

$$P = P_i P_j + P_j P_l + P_i P_l \qquad (7)$$

The estimated number of erasures obtained is equal to $$N_{Erasure} = \frac{k}{N}(P_i P_j + P_j P_l + P_i P_l) \qquad (8)$$

In a third example, also given purely by way of an illustration, we consider the case of a comparison of four data packets (or four copies).

Thus, if we consider four copies in adopting the same assumption (that the probability of two erroneous symbols being equal is zero), we obtain a fourth-order formula.

The probability P of four copies having a different value for a same symbol taken randomly in the set of symbols associated with each of the copies i, j, l, m is equal to:

$$P = P_i P_j P_l + P_i P_j P_m + P_j P_l P_m + P_i P_l P_m \qquad (9)$$

The estimated number of erasures is then equal to:

$$N_{Erasure} = \frac{k}{N}(P_i P_j P_l + P_i P_j P_m + P_j P_l P_m + P_i P_l P_m) \qquad (10)$$

Thus, the study of these three examples enables the above to be generalized to the case of M copies. We then obtain the above-mentioned formula (3).

By way of an illustrative example, here below in the description we consider the case of a Reed-Solomon type decoding. Indeed, the determining of the number of erasures maybe very advantageous when we use this type of decoding, which is the preferred mode of the invention, since a piece of information on the position of the erasures doubles the correction capacity of this decoder.

Naturally, the present invention can also be applied in the context of any other decoder used for decoding by erasure.

Figure 3:
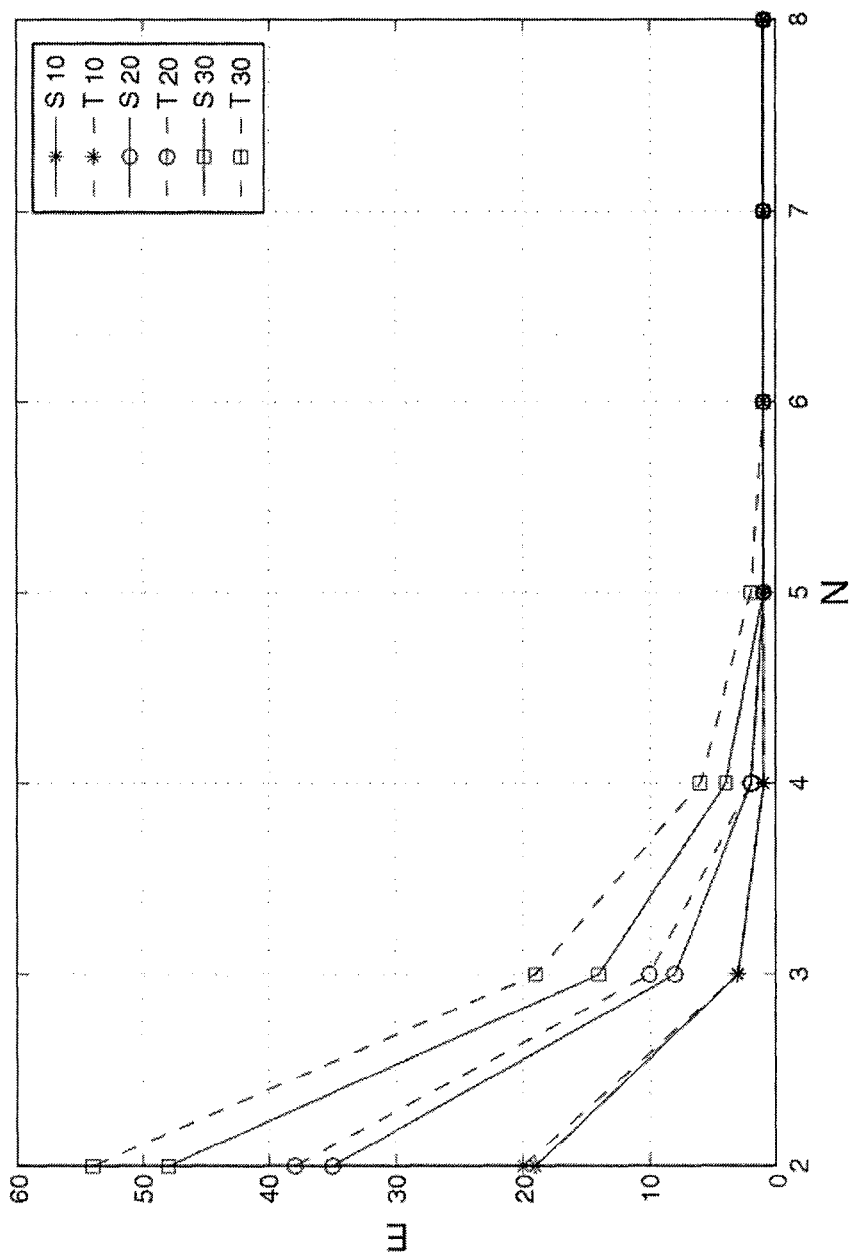
FIG. 3 illustrates an example of curves representing the estimated number of erasures obtained from the equation (3) according to the invention and the number obtained with a classic symbol/symbol comparison.

Referring now to FIG. 3, an example is presented of curves representing the estimated number of erasures obtained from the equation (3) and that obtained with a real symbol/symbol comparison.

FIG. 3 presents three comparisons between the estimated number of erasures referenced E with the device 200 of the invention, and the number obtained by an exhaustive symbol/symbol comparison depending on the number of copies, denoted as N; for different bit error rates (with a size of data packets equal to 114 bytes and a symbol size equal to eight bits depending on the above-mentioned numerical example).

The curves S10, S20 and S30 correspond to the curves obtained by means of an exhaustive symbol/symbol comparison with a number of errors for each data packet respectively equal to 10 erroneous bits, 20 erroneous bits and 30 erroneous bits respectively. Similarly, the curves T10, T20 and T30 correspond to the curves obtained by estimation of the number of erasures with the formula (3) and an error number respectively equal to 10 erroneous bits, 20 erroneous bits and 30 erroneous bits per data packet.

These curves prove the validity of the formula (3) for the following bit error rate BER: 1.1%, 2.2%, and 3.3%. Indeed, for a BER value equal to 1.1%, the two curves give appreciably the same number of erasures. When the bit error rate BER increases, a small difference arises between the two curves probably because of the two hypotheses considered:
the first hypothesis assumes that the symbol error rate SER corresponds to the probability of having an erroneous symbol;
the second hypothesis assumes that two erroneous symbols cannot have the same value.

These two hypotheses advantageously simplify the model based on the estimation of the number of erasures. They furthermore make the selection mechanism faster than a symbol/symbol comparison of copies.

Figure 4:
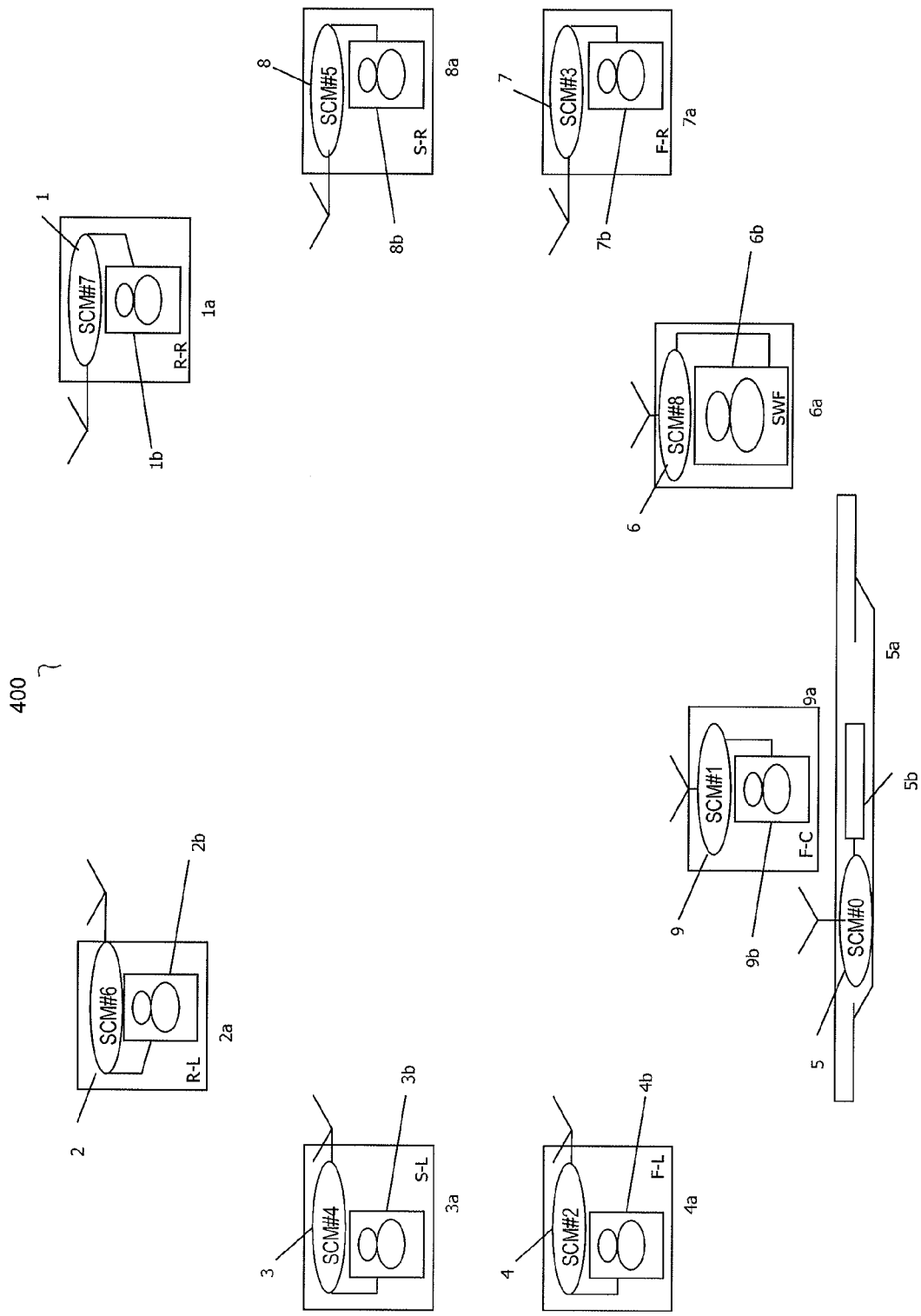
FIG. 4 is a diagram of a communications network in which the allocation method according to the preferred embodiment of the invention can be implemented.

Referring now to FIG. 4, an example is presented of a communications network in which the allocation method according to the preferred embodiment of the invention can be implemented.

Thus, the invention is embodied in a meshed wireless communications network 400 where each node transfers data proper to each destination node to the other nodes of the network synchronously. This case shall be illustrated here below in the description in considering a synchronous 60 GHz communications system consisting of nine transmission nodes, each of which implements the above-described allocation device (FIG. 2). Thus, each of the nodes 1a, 2a, 3a, 4a, 5a, 6a, 7a, 8a and 9a integrates a synchronous communications module (SCM) which integrates the different means used to execute the allocation method according to the invention.

More particularly, the communications system 400 comprises:
eight nodes 1a, 2a, 3a, 4a, 6a, 7a, 8a and 9a of a WAR (Wireless Audio Renderer) type each of which is equipped with digital audio channel amplifier means, respectively 1b, 2b, 3b, 4b, 6b, 7b, 8b and 9b, each integrating a speaker;
one WAD (Wireless Audio Decoder) type node 5a comprising a multi-channel audio decoder known as a Surround Sound Decoder (SSD), and a node 5b respectively, for example integrated into a flat screen and capable of transmitting on the different audio channels associated with the video displayed on the screen through the communications system 400 and in a perfectly synchronized way.

Figure 5:
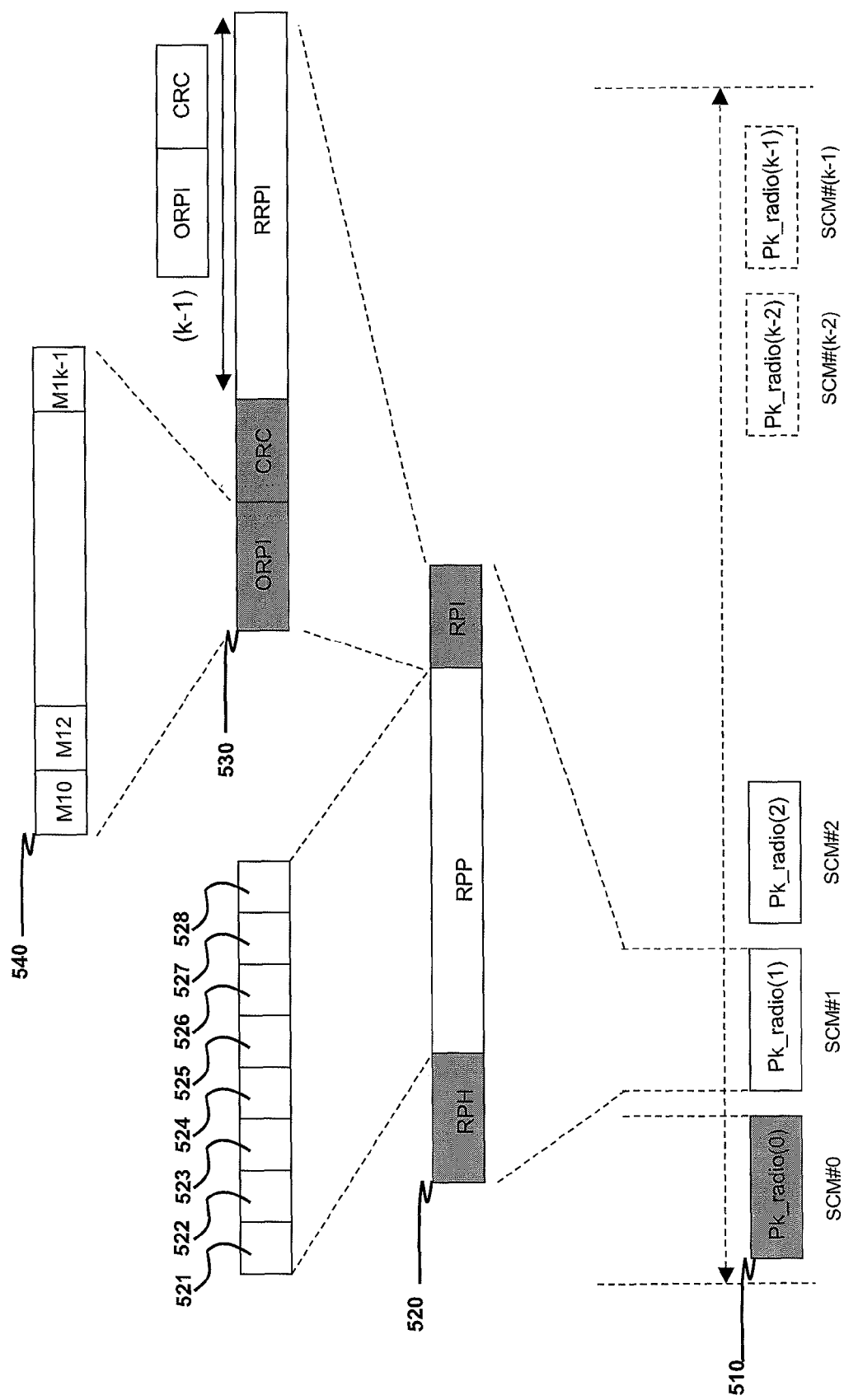
FIG. 5 shows the structure of a data super-frame transmitted within the communications network according to a particular embodiment of the invention.

This communications system 400 enables the WAD node to send the different WAR nodes, possibly by relays made by the WAR nodes, the information related to the different audio channels using data transmission by frames, organized as shown in FIG. 5 described here below.

FIG. 5 shows the structure of a data super-frame transmitted within the communications network 400 according to a particular embodiment of the invention.

During a synchronous data transmission cycle (SDTC), each communication module SCM#i (i identifying the index of the node or of the module) or node of the network transmits a radio packet "Pk_radio" 510 in a predefined sequence. It must be noted that a super-frame is sent at each SDTC cycle.

A radio packet consists of three data fields 520:
a field RPH (Radio Packet Header) used for example to identify the number of super-frames sent since the system was started, as well as an identifier of the radio packet sent;
a field of transmitted payload data or RPP (Radio Packet Payload) field used to transmit data corresponding to the digital channels of each WAR node.
an information data field or RPI (Radio Packet Information) field 530 enabling the broadcasting, in the context of the invention, of information pertaining to measurements of quality of radio links between the different nodes of the network. Each measurement received corresponds here to a measurement of the SNR symbol error rate made by an SCM#i destination node during the sending of a radio packet by the SCM#j node.

More specifically, the RPP field consists of a number of sub-fields called RDB, (Radio Data Block) fields which are equal in number to the number of nodes of the network (i.e. eight nodes according to the particular embodiment of FIG. 4). Each RDB sub-field contains piece of payload information intended for a node of the communications network. Indeed, these eight sub-fields RDB 521, 522, 523, 524, 525, 526, 527, 528 contain pieces of information designed respectively for the nodes SCM#1, SCM#2, SCM#3, SCM#4, SCM#5, SCM#6, SCM#7, SCM#8 and are organized according to the contents of a retransmission table. Its use is described in detail here below with reference to FIG. 6.

More specifically, the field RPI 430 comprises:
- a sub-field of information known as original information, called ORPI (Original Radio Packet Information) 440, corresponding to the information on SNR rate measured by a SCM#i node during the previous radio packet transmissions by other nodes of the network. The (k−1) measurements are referenced Mi,j where the index i identifies the node that has performed the measurement (in this case SCM#1), the index j identifies the node with reference to which this measurement is made (node SCM#2 for M1, 2, SCM#k for M1, k) and k refers to the number of nodes in of the network.
- a CRC (Cyclic Redundancy Check) sub-field for the protection of the ORPI data enabling the information receiver destination node to make sure that the information has not been corrupted by disturbances related to the radio channel.
- an RRPI (Relayed Radio Packet Information) sub-field consisting of relayed information pertaining to data measured by the other nodes (other than the SCM#1 node in the present case), to ensure that all the nodes of the network receive the signal-to-noise ratio (SNR) measurements even when there are fixed or temporary obstacles in the communications network 400. This RRPI sub-field consists of the concatenation of the (k−1) measurements of the signal-to-noise ratio SNR and their associated CRC protection received from the other nodes.

It is important to note that the information corresponding to the ORPI and RRPI sub-fields are transmitted for each allocation device in a fixed order known to the other nodes of the system to enable these nodes to identify the content of the information without any additional information. The nodes will thus constitute a table containing the information on the signal-to-noise ratio SNR measured by the set of nodes of the network.

It must also be noted that during the relaying of the information, a SCM node have been received an erroneous ORPI sub-field from another SCM node (or an erroneous RRPI sub-field from another SCM node) may detect this erroneous field in using the associated CRC sub-field. By default, if the SCM node has to relay a piece of information for a SCM node for which it does not have accurate information, it will position a piece of information relating to non-availability of the information in the corresponding sub-field.

Figure 6:
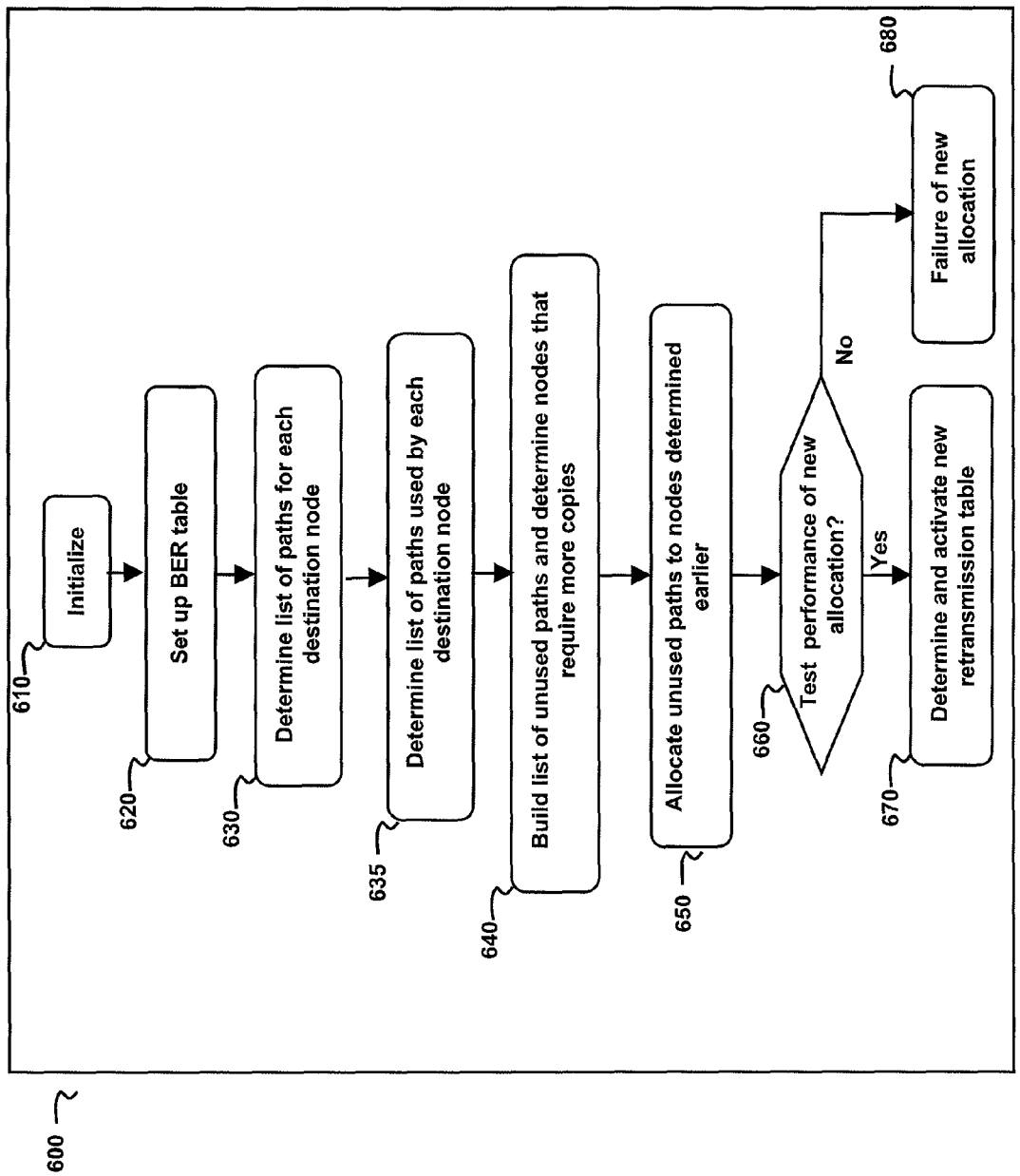
FIG. 6 is a flow chart of a particular embodiment of the method for the allocation of transmission paths according to the invention.

FIG. 6 is a flow chart of a particular embodiment of the method of allocation according to the invention.

In a particular embodiment of the invention, the method of allocation of transmission paths is implemented when initializing the system. This initialization corresponds to a powering on of the system after it has been powered off. Otherwise, it is performed through a specific command which activates the initialization and can be done, for example, with a button from a remote control unit or on one or more nodes of the network. The initialization method is typically executed just after the setting up of the communications network or else following an in-depth modification of the environment of deployment. The initializing of the system activates a new allocation of the transmission paths in order to configure the data transmission mechanisms in a manner suited to the situation in which the system is placed.

After the triggering of the initialization phase 610, all the nodes of the communications network simultaneously begin the method 600 for the allocation of transmission paths. The step 620 represents the phase of setting up an information table related to the measurements of the bit error rate BER. This information table of the BER is deduced from the measurements of the signal-to-noise ratio SNR which is estimated and then broadcast to all the other nodes of the network.

Once the bit error rate BER of the different links between the nodes has been estimated, the step 630, according to the method 700 described here below with reference to FIG. 7, makes it possible to determine the transmission paths that can be taken by a data packet sent by a source node up to the last relay node, i.e. up to the last node receiving the data packet before the destination node. Indeed, the optimal transmission paths can be determined if the bit error rate BER of the different links of the communications network is known.

It is important to note that, in the context of this step 630 of the method, the relay nodes are deemed not to retransmit the data packets only when this data packet no longer has the greatest signal-to-noise ratio SNR.

It is clear however that step 630 is only one example among others and must be suited to the retransmission policy chosen to determine the transmission paths used for the transmission of data from the source node to the last relay nodes.

By way of an illustrative example, the node SCM#3 of FIG. 4 can receive data packets through eight possible transmission paths (not complete) from the source node up to the last relay node SCM#3, namely:

SCM#0→SCM#3;
SCM#0→SCM#1→SCM#3;
SCM#0→SCM#2→SCM#3;
SCM#0→SCM#4→SCM#3;
SCM#0→SCM#5→SCM#3;
SCM#0→SCM#6→SCM#3;
SCM#0→SCM#7→SCM#3;
SCM#0→SCM#8→SCM#3.

Indeed, it must be noted that at this stage of the method, all the relay nodes upstream from the last relay are known. The complete transmission paths are determined thereafter.

The data packets intended for the destination node SCM#3 are therefore relayed by the relay nodes SCM#1, SCM#2, SCM#4, SCM#5, SCM#6, SCM#7, SCM#8. With the order of transmission of the nodes being known, it is deduced that the node SCM#2 relays the data intended for SCM#3 and coming from the source node (SCM#0) or else from the node SCM#1. If the node SCM#1 has been considered, the transmission path SCM#0→SCM#2→SCM#3 will be the following transmission path: SCM#0→ SCM#1→ SCM#2→SCM#3. Since the node SCM#2 is the last node to relay the data packets to the destination node, it is called the last relay node.

The step 635 of the allocation method is then executed according to the method 800 described here below with reference to FIG. 8. This step 635 is used to build a list pertaining to the transmission paths which will be used to transmit data packets from the source node to the destination node.

The step 640 of the allocation method is then executed according to the method 800 described here below with reference to FIG. 8. This step 640 makes it possible firstly to build a list pertaining to the transmission paths which will not used for the transmission of data packets from the source node to the destination node. Secondly, this step 640 also makes it possible to determine the nodes of the communications network necessitating the reception of additional copies so as to be able in principle to perform the right decoding, in other words so as to be capable of obtaining an estimated number of erasures smaller than or equal to the decoding capacity of the decoder.

Following the step 640, the step 650, called a step of allocation of the unused transmission paths, is done according to the method 900 described here below with reference to FIG. 9. The previously unused transmission paths are the transmission paths which are not necessary in principle for accurate decoding for a given destination node.

Once the allocation step 650 is terminated, then in the step 660, the nodes of the communications network, which have all obtained the same assignments of the transmission paths, determine a table of retransmission of the data packets to be retransmitted. This retransmission table is shared by all the nodes of the communications network. It describes the reception and transfer of appropriate data packets for each node of the communications network; it then represents data transmission paths in the network.

According to a particular mode compliant with the invention, the retransmission table is defined by a square matrix consisting of rows and columns respectively corresponding to the addresses of the relay nodes and to the address of the destination nodes.

As a first illustrative example, a retransmission table based on a symmetrical repetition code, also called an equitable repetition code, between all the nodes of the communications network is illustrated by the following matrix (11).

$$\begin{pmatrix} 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \end{pmatrix} \quad (11)$$

In this example, each node of the network retransmits the copies (or data packets) to all the nodes of the communications network and can in principle receive the same number of copies as the other nodes. It can be noted for example that, to the row 3 and the column 2, there corresponds the number of copies that the node SCM#3 is liable to transmit to the node SCM#2, i.e. one copy in this case.

In particular embodiment of the invention, the retransmission table (11) can be used as a default retransmission table.

In a second example, we present the determining of the retransmission table done for a communications network comprising three destination nodes and one source node after the determining (step 630) of the list of paths relative to each destination node. The following transmission paths for example have been determined.

SCM#0→SCM#1;
SCM#0→SCM#1→SCM#2→SCM#1;
SCM#0→SCM#1→SCM#2→SCM#3→SCM#1;
SCM#0→SCM#2;
SCM#0→SCM#1→SCM#2;
SCM#0→SCM#1→SCM#2→SCM#3→SCM#2;
SCM#0→SCM#3;
SCM#0→SCM#1→SCM#3;
SCM#0→SCM#1→SCM#2→SCM#3.

After the algorithms 800 and 900 (described here below with reference to FIGS. 8 and 9) have been executed, the paths obtained for each node are the following:
SCM#0→SCM#1;
SCM#0→SCM#1→SCM#2→SCM#1;
SCM#0→SCM#1→SCM#2→SCM#3→SCM#1;
SCM#0→SCM#1→SCM#2→SCM#1;
SCM#0→SCM#2;
SCM#0→SCM#1→SCM#2;
SCM#0→SCM#1→SCM#2→SCM#3→SCM#2;
SCM#0→SCM#3;
SCM#0→SCM#1→SCM#3;

It must be noted that, in this precise case, since the third transmission path, namely SCM#0→SCM#1→SCM#2→SCM#3 has already been allocated to the node SCM#1, the same path cannot be used again by the node SCM#3.

Then, from each transmission path, a retransmission vector is determined:
SCM#0→SCM#1→SCM#2→SCM#1=[1 1 0];
SCM#0→SCM#1→SCM#2→SCM#3→SCM#1=[1 1 1];
SCM#0→SCM#1→SCM#2→SCM#1=[1 1 0].

Each path is a vector in which the figure "1" corresponds to a retransmission, the figure "0" corresponds to a non-retransmission and the rank in the transmission vector corresponds to the relay node. The figure "1" in bold corresponds to the retransmission of the data packet by the last relay.

To obtain the retransmission matrix, a particular summing step called a "modified sum" of all the retransmission vectors is performed for each of the destination nodes considered. Another vector, called a transmission vector, is then obtained. It corresponds to the column of the retransmission matrix for a given destination node.

This "modified sum" is defined as follows. Let x, y, x, y be four integers for which the first two are considered to be integers "in bold characters" and the last two are considered to be integers "not in bold characters". This modified sum is defined in the set of integers in bold characters and in non-bold characters as follows:

"Modified sum" from x and from y is equal to (x+y)
"Modified sum" of x and y is equal to x
"Modified sum" of x and y is equal to y
"Modified sum" of x and y is equal to 1

Returning again to the above example, on the basis of each transmission path determined, a retransmission vector is determined:
SCM#0→SCM#1→SCM#2→SCM#1=[1 1 0];
SCM#0→SCM#1→SCM#2→SCM#3→SCM#1=[1 1 1];
SCM#0→SCM#1→SCM#2→SCM#1=[1 1 0].

According to the definition mentioned here above, the modified sum of these vectors for a destination node considered then gives the transmission vector V1=[1 2 1].
SCM#0→SCM#2;
SCM#0→SCM#1→SCM#2=[1 0 0];
SCM#0→SCM#1→SCM#2→SCM#3→SCM#2=[1 1 1].

The modified sum of these vectors then gives the transmission vector V2=[1,1,1]
SCM#0→SCM#3;
SCM#0→SCM#1→SCM#3=[1 0 0].

The modified sum of these vectors then gives the transmission vector V3=[1 0 0].

The retransmission matrix thus determined therefore has the form:

$$\begin{pmatrix} 1 & 1 & 1 \\ 2 & 1 & 0 \\ 1 & 1 & 0 \end{pmatrix} \quad (12)$$

with:
The first column being equal to the vector V1;
The second column being equal to the vector V2;
The third column being equal to the vector V3.

Each column corresponding to a given destination node in the retransmission matrix (12) is equal to the "modified sum" of all the retransmission vectors, each retransmission vector being determined from a distinct transmission path to the destination node considered.

By way of a third example, we now present the determining of the retransmission table done in the particular case of the communications network 400 with eight nodes and one source. The following retransmission path has been determined by the method 700 (with reference to FIG. 7) for the destination node SCM#3:

SCM#0→SCM#3→SCM#4→SCM#5→SCM#7→SCM#3

All the nodes belonging to this transmission path (nodes SCM#0, SCM#3, SCM#4, SCM#5 and SCM#7) will have to transfer the data intended for the node SCM#3, including the node SCM#3 itself.

This transmission path can be represented for example by the following retransmission vector:

Rtx_vector (SCM#3)=[0 0 1 1 1 0 1 0]

In the same way as here above (the case of the second example), each transmission path is a vector in which the figure "1" corresponds to a retransmission, the figure "0" corresponds to a non-retransmission and the rank in the retransmission vector Rtx_vector corresponds to the relay node. The figure "1" in bold corresponds to the retransmission of the data packet by the last relay node, i.e. the node SCM#7 in this specific case.

The following matrix (13) illustrates an example of the determining retransmission table in the case of the third example mentioned here above, namely:

$$\begin{pmatrix} 0 & 1 & 1 & 1 & 1 & 2 & 1 \\ 1 & 0 & 1 & 1 & 1 & 1 & 2 & 1 \\ 1 & 1 & 0 & 1 & 1 & 1 & 2 & 1 \\ 1 & 1 & 1 & 1 & 1 & 1 & 2 & 0 \\ 1 & 1 & 0 & 0 & 0 & 4 & 1 & 1 \\ 1 & 1 & 1 & 1 & 1 & 0 & 2 & 1 \\ 1 & 1 & 1 & 1 & 1 & 2 & 0 & 1 \\ 1 & 1 & 1 & 1 & 1 & 1 & 2 & 0 \end{pmatrix} \quad (13)$$

Using the retransmission table thus determined, the nodes establish the data packets intended for each node of the communications network.

Here below in the description, we shall consider the example of the node SCM#3 (row 3 of the matrix) intended for the transmission of a data packet.

Using the retransmission matrix (13), the node SCM#3 fills the RDB sub-fields (in the RPP field of the radio packets 510 of FIG. 5), placing one copy when the matrix contains the value "1", no copy when the matrix contains the value "0" and two copies when the matrix contains the value "2".

Consequently, the data packet SCM#3 thus constituted will contain two copies of the RDB sub-field for the node SCM#7 (RDB 527 of FIG. 5), one copy of RDB for nodes SCM#1, SCM#2, SCM#4, SCM#5, SCM#6 and SCM#8 (respectively RDB 521, 522, 524, 525, 526, 528) and no copy for itself (RDB 523).

Thus, all the nodes of the communications network have the same retransmission table available since the method of allocation according to the invention is deterministic.

The step 660 is therefore used to test the performance of the allocation made by the present invention. Indeed, the newly determined retransmission table is adopted if the number of nodes assumed to be decoding accurately is greater than the number obtained when the default retransmission table (or the previous retransmission table) is used or else if, on the whole, a smaller number of RDBs used is necessary to enable accurate decoding by all the destination nodes. One part of the bandwidth can thus be released in this case and assigned to another use.

The newly determined retransmission table is not adopted in the event of failure of the allocation method of the present invention, and the previously used retransmission table is kept (step 680).

If not, the newly determined retransmission table is adopted, and then activated during the execution of the step 670.

Figure 7:
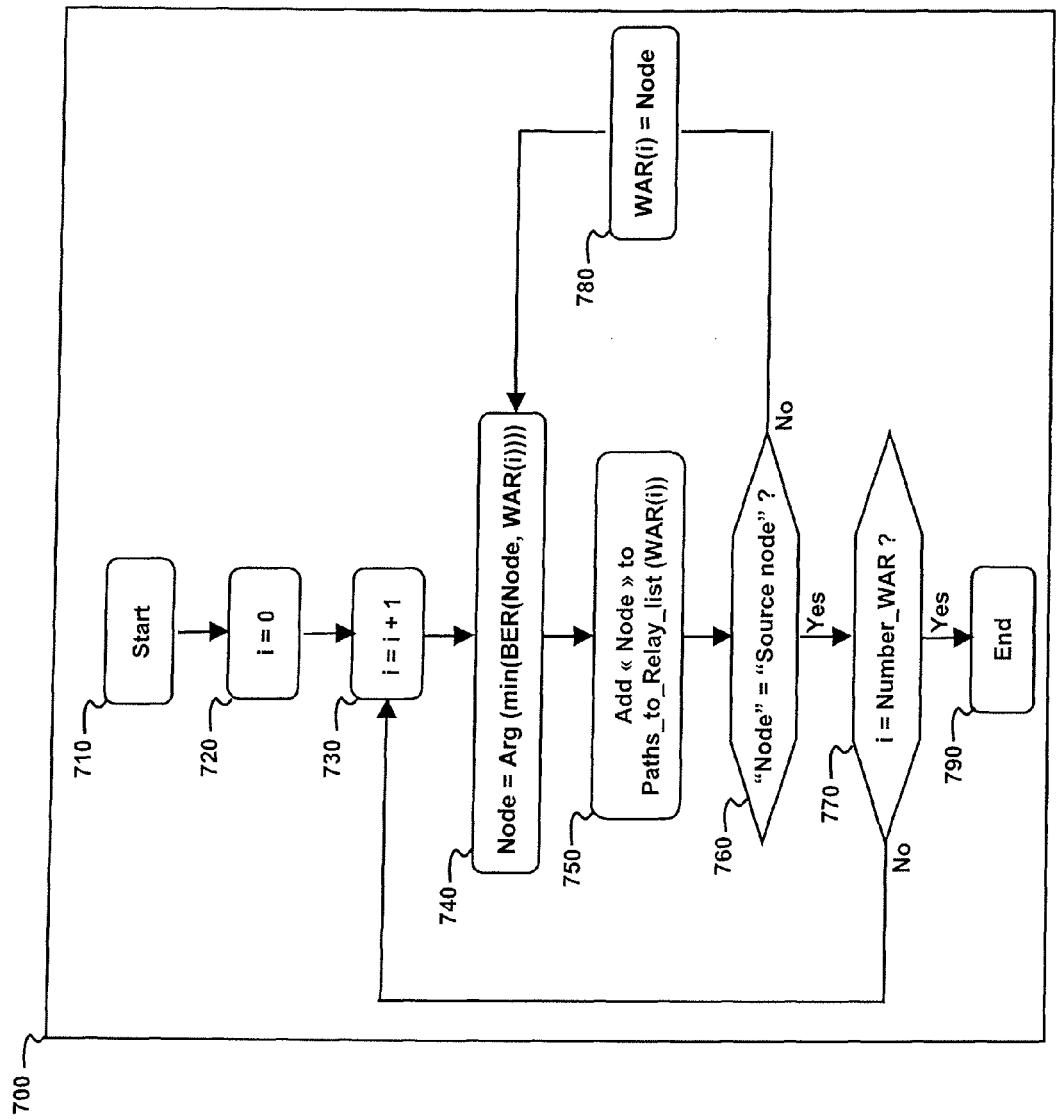
FIG. 7 is a flow chart of an algorithm for determining possible transmission paths to each destination according to a particular embodiment of the method of the invention.

Referring now to FIG. 7, we present an algorithm for determining the possible transmission paths towards each destination, according to a particular embodiment of the method of the invention. This embodiment of the method 700 corresponds to the steps 630 of the method of FIG. 6.

The goal of this step of the allocation method is to determine the list of all the relay nodes that have received the data packets before each last relay node for a given destination node. This list is identified in FIG. 7 by "Paths_to_Relay_1-ist". For each last relay node, only one path is considered. This transmission path can be determined in several particular embodiments.

According to a first particular embodiment of the method 700, the last link between two nodes of the network for a given transmission path selected is deemed to be the one having the smallest bit error rate BER. The search for the link having the smallest BER is illustrated in the step 740.

Initially, the steps 710 and 720 initialize the method 700. The step 730 is then necessary for the application, by means of an incrementation process, of the search for the transmission paths to all the nodes of the communications network. Then, the step 740 determines the index of the last node of the communications network giving communication with the smallest bit error rate BER. Once this node has been identified, the step 750 is used to store the index of the identified node in the list 'Paths_to_Relay_list" containing an identification of the nodes that constitute the transmission path from the sender node up to the last relay node, the node taking reception of the data packet just before the destination node.

The step 760 makes a test to find out if the identified node corresponds to the source node. If the test is positive, the search for the current node is stopped and the path is complete (step 770). The method continues with the determining of another possible path (return to step 730). If the test is negative, the algorithm determines the node situated before the current node, i.e. the node liable to receive the data packet just before the current node (step 780).

According to a second preferred embodiment, which is an alternative to the method 700, the transmission path having the lowest overall bit error rate BER is deemed to correspond to the transmission path having the highest quality, the overall bit error rate BER being the sum of the bit error rate of the links constituting the transmission path in question.

Once the transmission paths have been determined by the method 700 and the list, "Paths_to_Relay_list", is obtained, the method 800 is executed (described here below with reference to FIG. 8).

Figure 8:
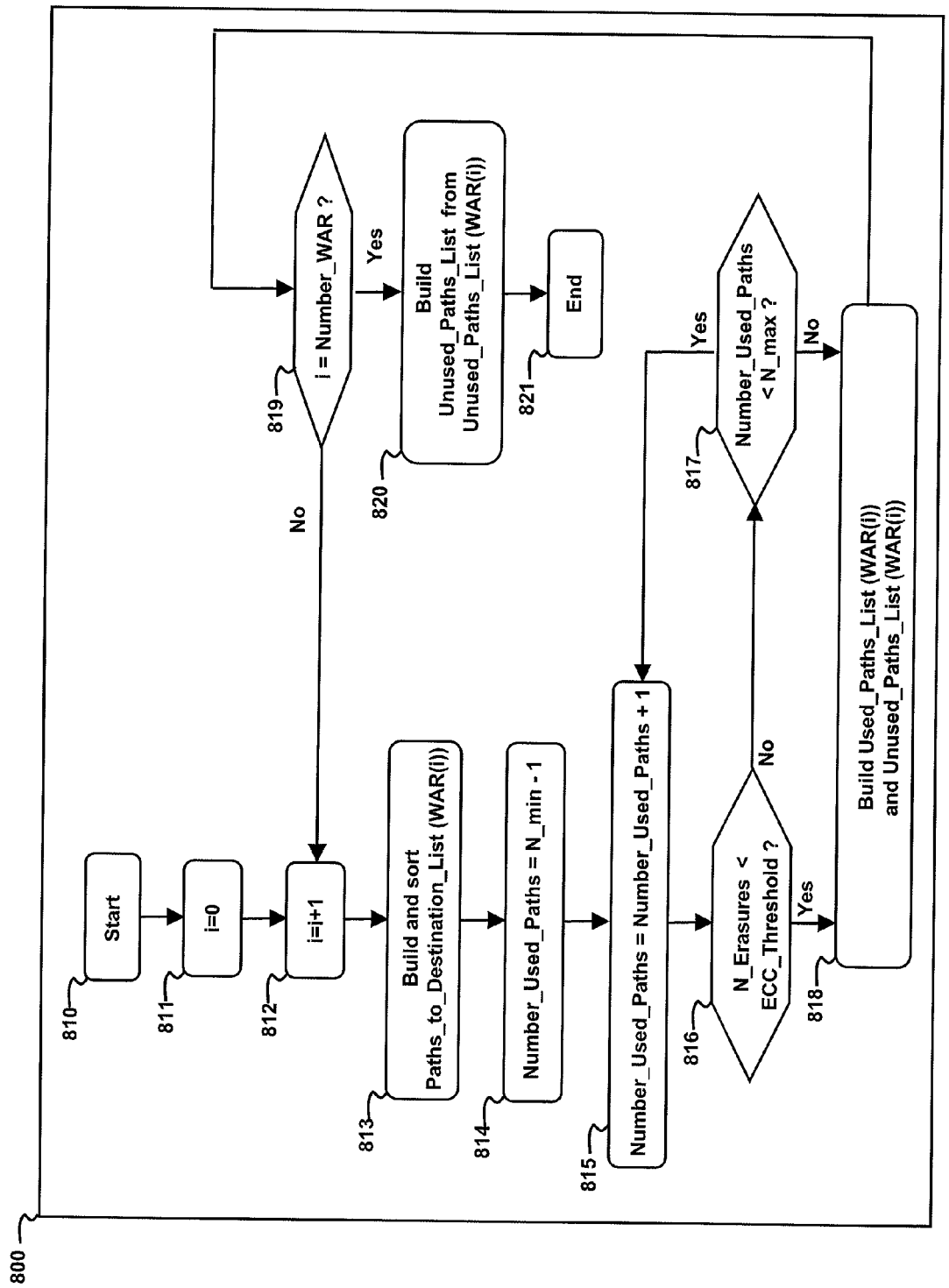
FIG. 8 is a flow chart of an algorithm for the selection of a set of transmission paths for an accurate decoding according to a particular embodiment of the method of the invention.

FIG. 8 presents an algorithm for the selection of a set of paths enabling accurate decoding, according to a particular embodiment of the method compliant with the invention. This algorithm is used to determine the list of all the possible transmission paths for a node of the given communications network which is identified by the list called "Paths_to_Destination_list".

For example, the list of paths of the node SCM#3 may be as follows:
SCM#0→SCM#3;
SCM#0→SCM#1→SCM#3;
SCM#0→SCM#1→SCM#2→SCM#3;
SCM#0→SCM#3→SCM#4→SCM#3;
SCM#0→SCM#3→SCM#4→SCM#5→SCM#3;
SCM#0→SCM#6→SCM#3;
SCM#0→SCM#3→SCM#4→SCM#5→SCM#7→SCM#3;
SCM#0→SCM#8→SCM#3.

Each list contains eight possible transmission paths (identified by "N max") to each destination. The transmission paths thus determined are classified according to their total bit error rate and then according to a piece of information on preferred geographical position of the last relay node. The term "geographical position" is understood to mean a position of the nodes relative to one another without its being thereby necessary to know the exact distance between the nodes. For example, in a home cinema system such as the one shown in FIG. 4, the position of the nodes relative to one another is predetermined by the very nature of the system. The geographical position of the last relay node is then considered to be the preferred position when it is a node neighboring the destination node in the pseudo circle of positioning of the speakers of the home cinema system.

The step 813 represents the process of sorting and building the "Paths_to_Destination_list". Intuitively, the transmission path that has a last relay node close to the destination node or in direct view of the destination node has priority. In this specific case, it is clear that the invention is not concerned with the quality of the communications before the last relay node. This choice may be defined statically during the deployment of the communications network. Indeed, the installer may, for example, define a table indicating the proximity of nodes to one another and give an indication of nodes which are in direct view for the transmission nodes in the LoS (Line of Sight) domain such as the 60 GHz frequency domain.

First of all, the steps 810 and 811 initialize the method 800. The incrementation step 812 is then needed to apply the search for the transmission paths to all the nodes of the communications network. Once the incrementation has been done, the step 813 classifies the transmission paths determined by the method 700 according to their bit error rate BER. Then, the steps 814 and 815 initialize the number of paths used with the value "N_min" representing the minimum number of paths identified. The number of paths is then incremented by 1 (step 815) if the estimated number of erasures obtained with this number of paths is greater than a predetermined correction threshold called "ECC_Threshold" (step 816). In other words, an additional transmission path is added to the list of transmission paths considered to determine whether the number of copies received will make it possible to obtain an adapted estimated number of erasures, i.e. a number smaller than or equal to the decoder capacity of the decoder at the destination node.

Once the estimated number of erasures becomes smaller than (or equal to) the predetermined threshold, the step 818 is executed. In this step, the list of transmission paths used, named "Used Paths_list" and the list of the unused transmission paths named "Unused_Paths_list" are prepared for each WAR (i) node of the communications network. The step 820 is used to combine all the lists of the unused transmission paths in a single list.

Thus, the method 800 is used to determine the destination nodes for which a number of erasures smaller then or equal to the correction capacity of their decoder is obtained with a minimum number of possible transmission paths, on the basis of a minimum number of paths identified by "N_min". At the end of the execution of the method 800, in addition to the paths that will be used to transmit data packets, each node of the communications network will have the same information, namely the identifiers of the nodes which, in principle, cannot perform any accurate decoding given the transmission paths which, for the time being, are assigned to them. This is why a list identified by "Unused_Paths_list" is drawn up. This list contains the transmission paths that are not used (paths unused) by the nodes which, in principle, can decode accurately without these paths, and is drawn up in order to go to the step of allocation of the transmission paths, described here below with reference to FIG. 9.

Figure 9:
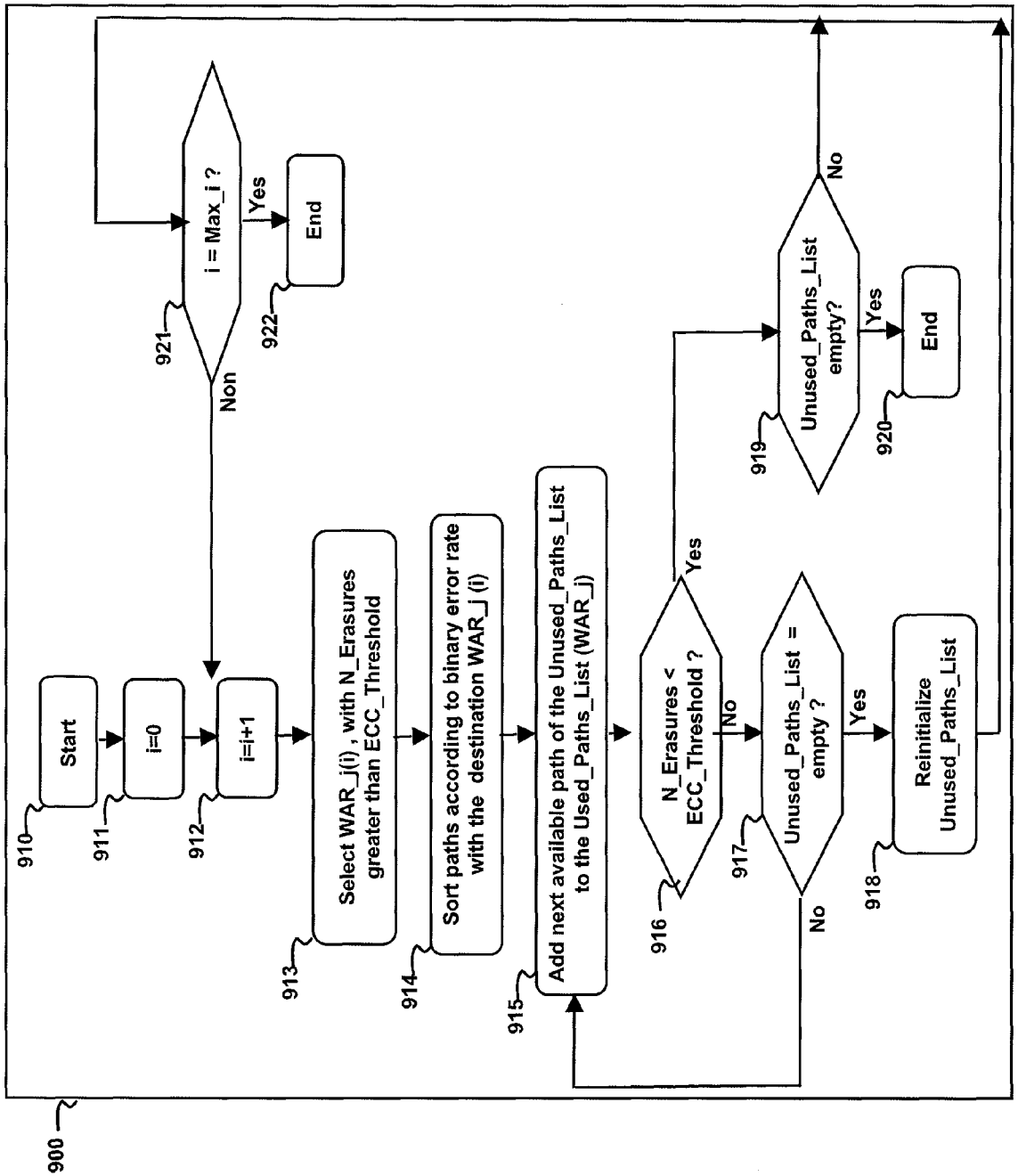
FIG. 9 is a flow chart of an algorithm for the allocation of transmission paths according to a particular embodiment of the method according to the invention.

Referring now to FIG. 9, we present a method 900 for the allocation of transmission paths to the nodes which, in principle, can not carry out accurate decoding.

The allocation is done for each WAR (i) node of the communications network in sorting out the transmission paths as a function of the bit error rate BER relatively to the destination node WAR (i), from the smallest bit error rate to the biggest bit error rate. This allocation of the transmission paths can thus be done by allocating the smallest number of the transmission paths with which it is possible to bring the number of erasures (measured by the equation (3)) down to a level below the predetermined correction threshold for each node of the communications network. The method 900 for the allocation of transmission paths is based on the same principle as the one described with reference to the method 800.

The steps 910, 911 and 912 first of all initialize the method 900. Then, the step 913 is executed to select a destination node for which a greater number of copies is in principle necessary for accurate decoding. A sorting of the transmission paths to be allocated to this node as a function of the bit error rate BER is then performed in the step 914. The step 915 is used to allocate an additional transmission path to the previously selected node if the number of erasures is smaller than or equal to the threshold (this is the test performed at the step 916) and if the list of unused transmission paths is not empty (test executed at the step 917).

When the number of erasures is greater than the predetermined correction threshold with all the transmission paths possible contained in the "Unused_Paths_list", the method initializes this list (step 918) and goes to the step of determining the transmission paths to be allocated to the node (steps 921 and 912).

The invention claimed is:

1. A method for managing an allocation of paths for transmission in packets of symbols of at least a first data content, said first data content being transmitted from a source node up to a destination node in a meshed communications network comprising a plurality of nodes, the destination node receiving a plurality of copies of packets of symbols of the first data content transmitted to said destination node by the source node, each copy being received through a distinct transmission path from said source node directly or through at least one relay node of the meshed communications network, said packets being encoded with an error correction code enabling decoding by erasure of packets symbols, the method comprising the steps of:

selecting a set of transmission paths from said source node up to said destination node for the transmission of copies of at least one packet of said first data content, for which an estimated first number of erasures of the symbols of said at least one packet is smaller than a determined threshold, said first number of erasures being estimated from a piece of information on a quality of transmission that is determined and associated with each of said selected transmission paths, said threshold being determined as a function of an erasure correction capability of said error correction code; and allocating said selected transmission paths to the transmission of said first data content from said source node up to said destination node.

2. The method according to claim 1, wherein said piece of information on the quality of transmission associated with a selected transmission path is a bit error rate determined for said selected transmission path, and wherein a number of erasures is estimated from the following formula:

$$N_{Erasures} = \frac{k}{N} \sum_{i=1}^{M} \prod_{j=1, j\neq i}^{M} (1 - (1 - BER_j)^N)$$

with:
$N_{Erasures}$: said estimated number of erasures;
$BER_j$: the bit error rate of the copy j for its transmission from the source node to the destination node;
k: the size of a packet in bits;
N: the number of bits per symbol; and
M: the number of paths selected.

3. The method according to claim 1, wherein the method further comprises, prior to said selecting step, preliminary steps of determining a set of last relay nodes, said last relay nodes being capable of communicating directly with the destination node, and of determining possible transmission paths from said source node up to each of said last relay nodes, and wherein the selecting step is performed on the basis of the determined possible transmission paths.

4. The method according to claim 3, wherein said step of determining possible transmission paths is performed by selecting a single transmission path for each of the last relay nodes among possible transmission paths for said last relay node.

5. The method according to claim 4, wherein said single transmission path is selected as a function of a piece of information on the quality of transmission associated with said possible transmission paths for said last relay node.

6. The method according to claim 5, wherein said piece of information on the quality of transmission associated with said possible transmission paths corresponds to a piece of information on a bit error rate associated with said possible transmission paths.

7. The method according to claim 6, wherein said piece of information on the quality of transmission associated with said possible transmission paths further corresponds to a piece of information representing the relative position of the last relay nodes in relation to the destination node.

8. The method according to claim 1, wherein the method further comprises a step of determining a set of non-selected transmission paths corresponding to transmission paths present in a reference allocation for the transmission of said first data content from said source node up to said destination node and not selected during the selecting step.

9. The method according to claim 8, wherein the method further comprises a second allocating step of allocating at least one of said non-selected transmissions paths to a requesting destination node for a transmission of a second data content.

10. The method according to claim 9, wherein, prior to said second allocating step, said requesting destination node is a destination node for which a set of transmission paths is allocated, for which an estimated second number of erasures is greater than said predetermined threshold.

11. The method according to claim 1, wherein the method further comprises a step of determining a new retransmission table, representing a distribution and an occupation of bandwidth in the network, performed as a function of said step of allocating said selected transmission paths.

12. The method according to claim 11, wherein the method further comprises steps of:

determining a first number of nodes, which are destination nodes for given data contents, having a set of allocated transmission paths for which an estimated number of erasures is smaller than said predetermined threshold, if said new retransmission table is used; and comparing the first determined number of nodes with a second number of nodes, which are destination nodes for said given data contents, having a set of allocated transmission paths for which an estimated number of erasures is smaller than said predetermined threshold, if a reference retransmission table is used, wherein said new retransmission table is adopted if the result of said comparison verifies at least one condition.

13. The method according to claim 12, wherein said condition belongs to the group comprising:

the first number of nodes is greater than the second number of nodes; and the bandwidth used with the new retransmission table is smaller than the bandwidth used with the reference retransmission table.

14. A non-transitory computer-readable storage medium, storing a set of instructions that may be run by a computer in order to implement a method for managing an allocation of paths for transmission in packets of symbols of at least a first data content, said first data content being transmitted from a source node up to a destination node in a meshed communications network comprising a plurality of nodes, the destination node receiving a plurality of copies of packets of symbols of the first data content transmitted to said destination node by the source node, each copy being received via a distinct transmission path directly from said source node or via at least one relay node of the meshed communications network, said packets being encoded with an error correction code enabling decoding by erasure of packet symbols, and said method comprising steps for:
selecting a set of transmission paths from said source node up to said destination node for the transmission of copies of at least one packet of said first data content, for which an estimated first number of erasures of the symbols of said at least one packet is smaller than a determined threshold, said first number of erasures being estimated from a piece of information on a quality of transmission that is determined and associated with each of said selected transmission paths, said threshold being determined as a function of an erasure correction capability of said error correction code; and allocating said selected transmission paths to the transmission of said first content from said source node up to said destination node.

15. A manager device for managing an allocation of paths for transmission in packets of symbols of at least a first data content, said first data content being transmitted from a source node up to a destination node in a meshed communications network comprising a plurality of nodes, said destination node receiving a plurality of copies of packets of symbols of the first data content transmitted to said destination node by said source node, each copy being received via a distinct transmission path directly from said source node or via at least one relay node of the meshed communications network, said packets being encoded with an error correction code enabling decoding by erasure of packet symbols, wherein the device comprises:

selecting means for selecting a set of transmission paths from said source node up to said destination node for the transmission of copies of at least one packet of said first data content, for which an estimated first number of erasures of the symbols of said at least one packet is smaller than a determined threshold, said first number of erasures being estimated from a piece of information on a quality of transmission that is determined and associated with each of said selected transmission paths, said threshold being determined as a function of an erasure correction capability of said error correction code; and allocating means for allocating said selected transmission paths to the transmission of said first content from said source node up to said destination node.

16. The manager device according to claim 15, wherein said piece of information on the quality of transmission associated with a selected transmission path is a bit error rate determined for said selected transmission path, and wherein the device further comprises means for estimating a number of erasures from the following formula:

$$N_{Erasures} = \frac{k}{N} \sum_{i=1}^{M} \prod_{j=1, j \neq i}^{M} (1 - (1 - BER_j)^N)$$

with:
$N_{Erasures}$: said estimated number of erasures;
$BER_j$: the bit error rate of the copy j for its transmission from the source node to destination node;
k: the size of a packet in bits;
N: the number of bits per symbol; and
M: the number of paths selected.

17. The manager device according to claim 15, wherein the device further comprises means for, prior to the selecting by the selecting means, performing preliminary steps of determining a set of last relay nodes, said last relay nodes being capable of communicating directly with the destination node, and determining possible transmission paths from said source node up to each of said last relay nodes, and wherein said selecting by said selecting means is performed on the basis of the determined possible transmission paths.

18. The manager device according to claim 17, wherein said determining possible transmission paths is performed by selecting a single transmission path for each last relay node among possible transmission paths for said last relay node.

19. The manager device according to claim 15, wherein the device further comprises second determining means for determining a set of non-selected transmission paths corresponding to transmission paths present in a reference allocation for the transmission of said first data content from said source node up to said destination node and not selected by said selecting means.

20. The manager device according to claim 19, wherein the device further comprises second allocating means for allocating at least one of said non-selected transmissions paths to a requesting destination node for a transmission of a second data content, said requesting destination node being a destination node for which, prior to said allocating by said second allocating means, a set of transmission paths is allocated, for which an estimated second number of erasures is greater than said predetermined threshold.

* * * * *